Aug. 23, 1927.

P. F. BURGETT 1,640,263

TRUCK

Filed Feb. 18, 1924

P. F. Burgett
INVENTOR

BY Victor J. Evans
ATTORNEY

Aug. 23, 1927.
P. F. BURGETT
TRUCK
Filed Feb. 18, 1924
1,640,263
2 Sheets-Sheet 2
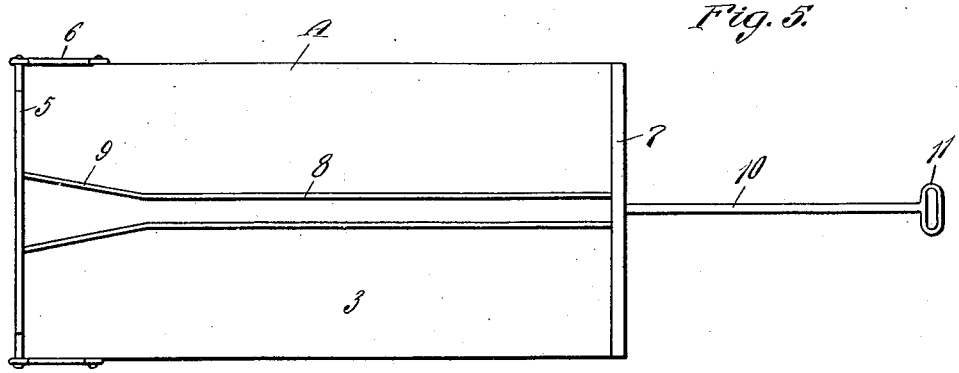
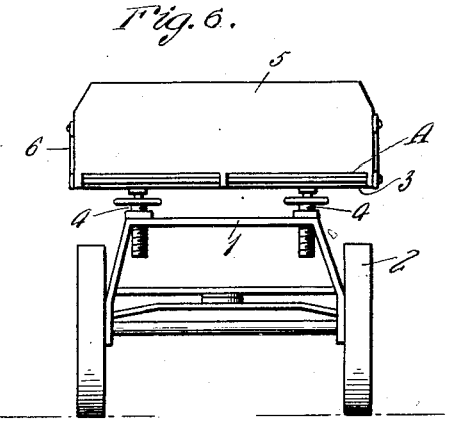
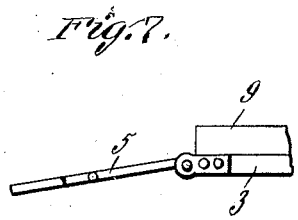
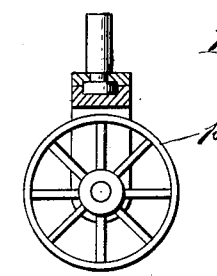
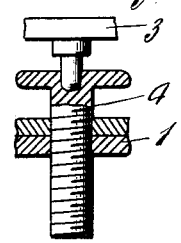
P. F. Burgett
INVENTOR
BY Victor J. Evans
ATTORNEY Patented Aug. 23, 1927.

1,640,263

UNITED STATES PATENT OFFICE.

PAUL F. BURGETT, OF MEXICO, MISSOURI.

TRUCK.

Application filed February 18, 1924. Serial No. 693,678.

This invention relates to trucks for facilitating the loading and unloading of baggage, mail and other merchandise, the general object of the invention being to provide a large truck which can be backed up to the car door and a small truck which can be run from the large truck into the car, or from the car on to the large truck.

Another object of the invention is to make the platform of the large truck adjustable so that said platform can be adjusted to the height of the sill of the car and to provide it with a track for receiving some of the wheels of the small truck.

A further object of the invention is to make the end pieces of the small truck foldable so that they can be folded down upon the body when the truck is not in use.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figures 3 and 4 are detail views of this truck.

Figure 5 is a plan view of the large truck.

Figure 6 is an end view thereof.

Figures 7 and 8 are detail views of this large truck.

Figure 1:
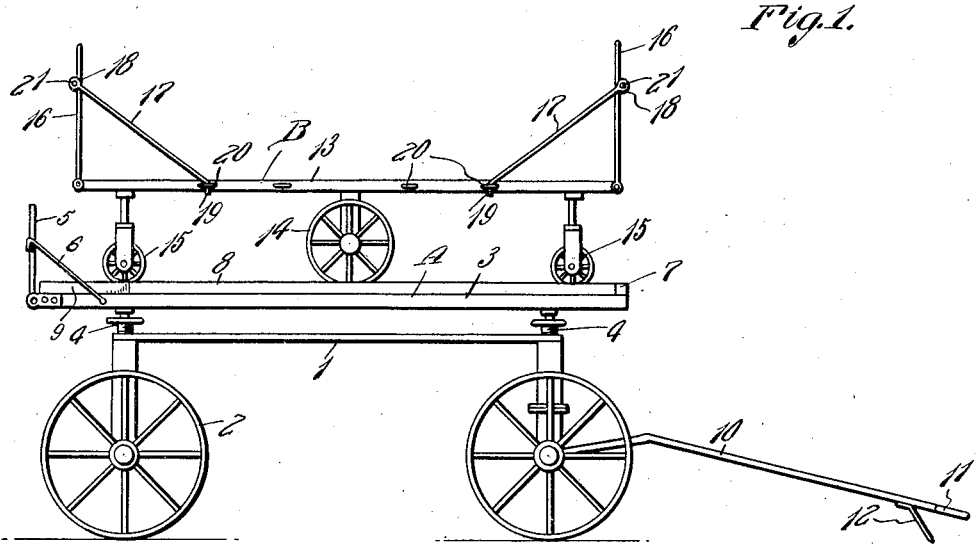
Figure 1 is an elevation showing the two trucks together.
Figure 2:
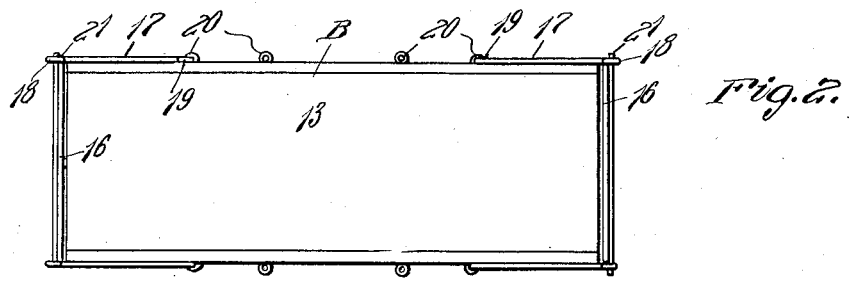
Figure 2 is a plan view of the small truck.
Figure 3:
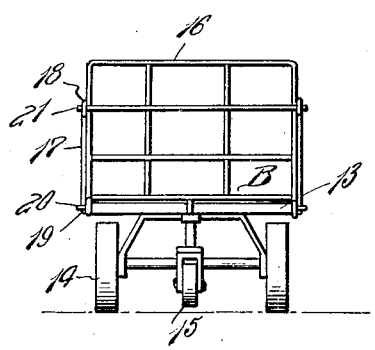

In these views, A indicates the large truck and B the small truck. The large truck consists of a frame 1 which is supported by the wheels 2 and the platform 3 which is adjustably connected with the frame by the screw devices 4 so that this platform can be adjusted vertically. A shown in Figures 1, 6 and 8, the members 4 are made in the form of jacks, and have sockets in their upper ends which receive depending projections on the platform. The jacks are arranged at the corners of the frame 1. By this arrangement, the platform can be leveled when the wheels are on a slanting surface. A plate 5 is hinged to one end of the platform 3 and is held in upright position by the hook rods 6. A cross piece 7 extends across the other end of the platform to prevent the small truck from running off this end. A pair of rails 8 are fastened to the center of the platform and are parallel for the major portion of their length. The rear ends of these rails flare outwardly, as shown at 9. A tongue 10 is fastened to the front end of the truck and has a handle 11 on its free end. It is also provided with a prong 12 which is adapted to engage the surface on which the truck runs so as to prevent the truck from moving forward when placed in position.

The small truck B comprises a platform 13 which is mounted on the wheels 14, located at the center, and one at each side, and the caster wheels 15 which are arranged in the longitudinal center and adjacent the ends of the platform. These caster wheels are arranged to enter the space between the two rails 8 on the large truck, the flaring ends 9 acting as guiding means for such wheels as the small truck moves upon the large truck. An end frame 16 is hingedly connected with each end of the platform 13 and these end frames are held in upright position by the brace bars 17 each of which is provided with an eye 18 at one end and a straight end 19, these ends being designed to engage the eye bolts 20 placed in the side edges of the platform with the eyes 18 engaging the projecting ends of the bars 21 carried by the end frames. Thus these end frames are held in upright position by the brace bars 17 but they can be folded down upon the platform so that the small truck will occupy but little space when not in use.

From the foregoing, it will be seen that by placing the small truck upon the large truck and backing the large truck against the car door and then swinging down the end 5 the small truck can be pushed into the car and another small truck, which has been loaded in the car, can be pushed from the car on to the large truck. Thus the loading and unloading of cars is greatly facilitated by my invention and by having a number of small trucks in a car, the car can be quickly unloaded and then loaded again, by shoving the loaded trucks from the car upon the large trucks and moving the small trucks containing the new loads into the car. By making the platform of the large truck adjustable, it may be moved to position where it will be level with the sill of the car door.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A loading device comprising a main frame, a platform mounted for vertical adjustment on said main frame, parallel rails extending longitudinally of the central portion of said platform, a stop piece extending at one end of said platform, a foldable plat at the other end of the platform, flared ends on said rails at one end of the platform, a second truck having spaced supporting wheels at the central portion thereof and caster wheels at each end of the second truck for engagement upon the rails on the platform of the main truck and foldable end frames at each end of the second truck as and for the purpose specified.

In testimony whereof I affix my signature.

PAUL F. BURGETT.